(12) United States Patent
Shirabe et al.

(10) Patent No.: US 7,493,891 B2
(45) Date of Patent: Feb. 24, 2009

(54) INTERNAL COMBUSTION ENGINE

(75) Inventors: Takeo Shirabe, Nishikamo-gun (JP);
Tsunero Hamada, Iwata (JP)

(73) Assignees: Toyota Jidosha Kabushiki Kaisha, Toyota (JP); Yamaha Hatsudoki Kabushiki Kaisha, Iwata-shi (JP)

( * ) Notice: Subject to any disclaimer, the term of this patent is extended or adjusted under 35 U.S.C. 154(b) by 0 days.

(21) Appl. No.: 11/798,428

(22) Filed: May 14, 2007

(65) Prior Publication Data

US 2007/0266967 A1   Nov. 22, 2007

(30) Foreign Application Priority Data

May 16, 2006   (JP) .............................. 2006-136895

(51) Int. Cl.
*F02B 15/00* (2006.01)
*F02B 15/02* (2006.01)

(52) U.S. Cl. .................................... 123/432; 123/193.3

(58) Field of Classification Search ................ 123/432, 123/193.5, 41.82 R, 308, 193.3, 193.1; 60/293, 60/304, 306, 307, 305
See application file for complete search history.

(56) References Cited

U.S. PATENT DOCUMENTS

| 4,387,565 | A | * | 6/1983 | Otani et al. ................... 60/293 |
|---|---|---|---|---|
| 4,434,615 | A | * | 3/1984 | Ikenoya et al. ................ 60/293 |
| 5,657,628 | A | * | 8/1997 | Takeuchi ...................... 60/293 |
| 5,730,095 | A | * | 3/1998 | Dohn et al. ............... 123/193.5 |
| 6,327,853 | B1 | * | 12/2001 | Fujii et al. ..................... 60/304 |
| 6,513,506 | B1 | * | 2/2003 | Ito et al. ................. 123/568.13 |
| 6,752,118 | B2 | * | 6/2004 | Joos et al. ................ 123/193.5 |
| 2002/0112696 | A1 | * | 8/2002 | Watanabe ................... 123/432 |
| 2003/0192502 | A1 | * | 10/2003 | Joos et al. ................ 123/193.5 |

FOREIGN PATENT DOCUMENTS

| JP | 52-87812 U | 6/1977 |
|---|---|---|
| JP | 59-145320 A | 8/1984 |
| JP | 59-213916 A | 12/1984 |
| JP | A 06-147063 | 5/1994 |
| JP | A 2000-073752 | 3/2000 |
| JP | A 2000-087739 | 3/2000 |
| JP | A 2005-248794 | 9/2005 |

* cited by examiner

*Primary Examiner*—Mahmoud Gimie
(74) *Attorney, Agent, or Firm*—Oliff & Berridge, PLC

(57) ABSTRACT

An internal combustion engine is provided that includes a combustion chamber; a secondary air passage located above the combustion chamber; an exhaust passage that communicates with the combustion chamber; and a water jacket that is located between the exhaust passage and the secondary air passage.

18 Claims, 5 Drawing Sheets

INTERNAL COMBUSTION ENGINE

INCORPORATION BY REFERENCE

The disclosure of Japanese Patent Application No. 2006-136895 filed on May 16, 2006 including the specification, drawings and abstract is incorporated herein by reference in its entirety.

BACKGROUND OF THE INVENTION

1. Field of the Invention

The present invention relates to an internal combustion engine, in particular, to an internal combustion engine that has a secondary air passage located above a combustion chamber.

2. Description of the Related Art

Conventionally, an internal combustion engine that has a secondary air passage is known. In such internal combustion engines, an internal combustion engine that has a secondary air passage located above a combustion chamber (see, for example JP-A-2005-248794, JP-A-2000-87739), or an internal combustion engine that has a secondary air passage extending along an exhaust passage (see, for example, JP-A-2000-73752) are known. The secondary air passage introduces secondary air into the exhaust passage, and the introduced secondary air is used for afterburning of the exhaust gas. Afterburning of the exhaust gas reduces unburned components, such as HC and CO, in the exhaust gas. Further, JP-A-2000-73752 describes an internal combustion engine in which a water jacket is formed between a secondary air passage formed along the exhaust gas passage and an upper surface of cylinder heads. This water jacket cools the upper portion of the cylinder heads by coolant, and prevents a packing, a gasket, etc. from being deteriorated by heat.

Meanwhile, as a more specific example of an internal combustion engine that has a secondary air passage located above the combustion chamber, an internal combustion engine is known that has a secondary air passage extending in a direction of cylinder arrangement. Such an internal combustion engine can reduce the number of components or processing sites, as compared to the internal combustion engines described in the three references identified above. In other words, such an internal combustion engine is favorable in cost However, when the afterburning of the exhaust gas is not performed, the high-temperature exhaust gas flows into and stays in the secondary air passage. Accordingly, in such an internal combustion engine, because of its structure, heat radiation from the secondary air passage may cause various adverse affects on the components. More specifically, for example, increase in the intake air temperature reduces volumetric efficiency of the intake air, and the output performance of the internal combustion engine may thus be reduced. Further, when the intake air temperature increases, knocking may occur more easily. Furthermore, for example, the temperature of a valve operating mechanism that operates an intake valve or an exhaust valve may increase, as compared to conventional structures, and reliability may thus decrease. Further, for example, the engine oil staying above the secondary air passage may receive heat, thereby accelerating the deterioration of engine oil by heat.

SUMMARY OF THE INVENTION

Accordingly, the present invention provides an internal combustion engine that reduces adverse influences on engine components by the secondary air passage located above the combustion chamber.

A first aspect of the present invention provides an internal combustion engine that has a secondary air passage located above a combustion chamber. A water jacket is provided between the secondary air passage and an exhaust passage that communicates with the combustion chamber. According to the first aspect of the present invention, the high-temperature exhaust gas that flows in and stays in the secondary air passage is cooled down by the coolant flowing through the water jacket. Further, because of the location of the water jacket, it is possible to prevent the secondary air passage from receiving heat from the exhaust passage through which the high-temperature exhaust gas flows. Therefore, various adverse affects on components of the engine by the heat radiation from the secondary air passage are effectively reduced.

In a second aspect of the present invention, an internal combustion engine is provided that has a secondary air passage located above a combustion chamber. A water jacket is -provided between the secondary air passage and an intake passage that communicates with the combustion chamber. According to this aspect of the present invention, high-temperature exhaust gas that flows in and stays in the secondary air passage is cooled down by the coolant flowing through the water jacket. Accordingly, various adverse affects on engine components by the heat radiation from the secondary air passage can be reduced. Further, because of the location of the water jacket, heat receiving of the intake passage is reduced, and thereby effectively suppressing the increase in temperature of the intake air, in particular.

A third aspect of the present invention provides an internal combustion engine having a secondary air passage located above a combustion chamber. A water jacket is formed so as to circumscribe the secondary air passage. According to the aspect of the present invention, because of the shape of the water jacket, the high-temperature exhaust gas that flows in and stays in the secondary air passage can be effectively cooled down by the coolant flowing through the water jacket. As a result, various adverse influences on components of the engine by the heat radiation from the secondary air passage can be effectively reduced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Example embodiments according to the present invention will be described with reference to the accompanying drawings.

Figure 1:
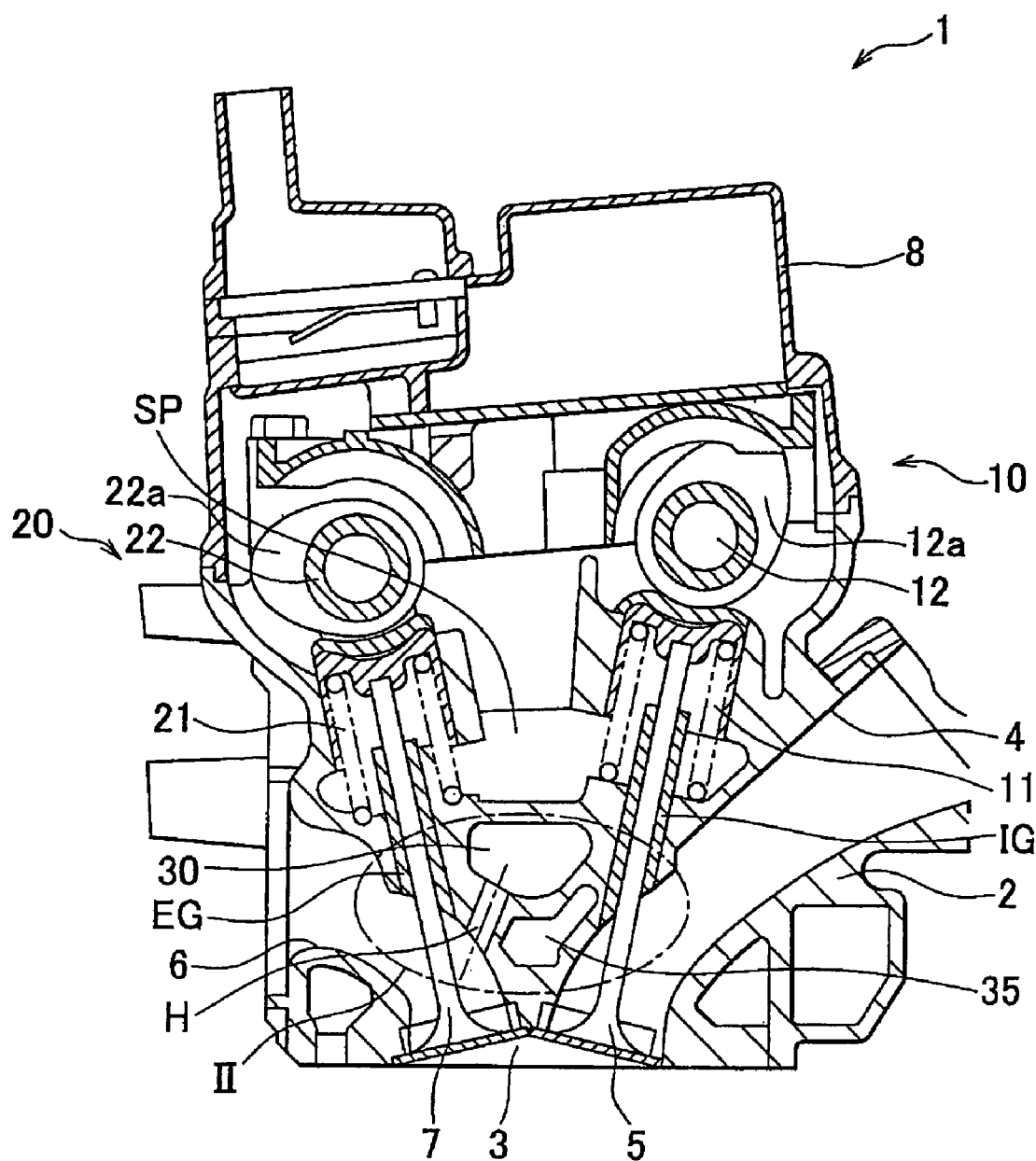
FIG. 1 is a schematic view illustrating main portions of an internal combustion engine.

FIG. 1 is a schematic view illustrating main portions of an internal combustion engine 1 according to an example embodiment. More specifically, FIG. 1 shows a cylinder head 2 of the internal combustion engine 1 and other components related to the cylinder head 2, as the main portions of the internal combustion engine 1. Further, the internal combustion engine 1 has an inline four cylinder arrangement. In FIG. 1, main portions of a single cylinder, viewed from the axial direction of a crankshaft, is shown as a representative of cylinders. Note that the cylinder arrangement is not limited to the inline four cylinder arrangement Furthermore, in this example embodiment, both the axial direction of the crankshaft and the direction of the cylinder arrangement L are in the direction generally perpendicular to the plane of the paper on which the drawing is drawn. The cylinder head 2 forms an upper wall surface of the combustion chamber 3. In the cylinder head 2, an intake passage 4 to conduct intake air into the combustion chamber 3, and an exhaust passage 6 to discharge burned gas from the combustion chamber 3 are formed. The cylinder head 2 also has an intake valve 5 to open and close the intake passage 4, and an exhaust valve 7 to open and close the exhaust passage 6. Further, the cylinder head 2 is provided with a space Sp having an opening facing upward. In the space Sp, an intake valve operating mechanism 10 and an exhaust valve operating mechanism 20 are provided. Further, engine oil stays in the space Sp. The engine oil mainly lubricates bearing portions of camshafts 12 and 22. A cylinder head cover 8 covers the space Sp.

The intake valve operating mechanism 10 includes a coil spring 11 and the camshaft 12, as well as a rocker arm, etc., which is not shown in the drawings. The coil spring 11 operates the intake valve 5 in a direction to close the intake passage 5. A cam 12a operates the intake valve 5 in a direction to open the intake passage 4, and is formed on the camshaft 12. An intake valve guide IG guides the movement of the intake valve 5. Similarly, the exhaust valve operating mechanism 20 includes a coil spring 21 and a camshaft 22, as well as a rocker arm, etc., which is not shown in the drawings. The coil spring 21 operates the exhaust valve in a direction to close the exhaust passage 6. The cam 22a formed on the camshaft 22 operates the exhaust valve 7 in a direction to open the exhaust passage 6. The exhaust valve guide EG guides the movement of the exhaust valve 7. The camshafts 12 and 22 rotate synchronous to the rotation of a crankshaft, which is not shown in the drawings. Further, the intake valve operating mechanism 10 and the exhaust valve operating mechanism 20 each may include a variable valve timing mechanism, a variable valve lift mechanism, or the like. Furthermore, instead of the valve operating mechanisms 10 and 20, overhead valve operating mechanisms may be used.

A secondary air passage 30 is located above a combustion chamber. The secondary air passage 30 is formed in the cylinder head 2. The secondary air passage 30 conducts secondary air into the exhaust gas passage 6 and communicates with the exhaust passage 6 via a secondary air port H. Further, the secondary air is pumped to the secondary air passage 30 from an air pump, which is not shown in the drawings. The air pump sucks air passing through a filter of an air cleaner, which is not shown in the drawings, and pumps the sucked air, as the secondary air, to the secondary air passage 30. Note that the connection between the secondary air passage 30 and the air pump is not limited particularly, but the secondary air passage 30 and the air pump can be connected each other in any appropriate manner. When the secondary air is not pumped, exhaust gas flows in the secondary air passage 30 from the exhaust passage 6 and stays in the secondary air passage 30.

Figure 2:
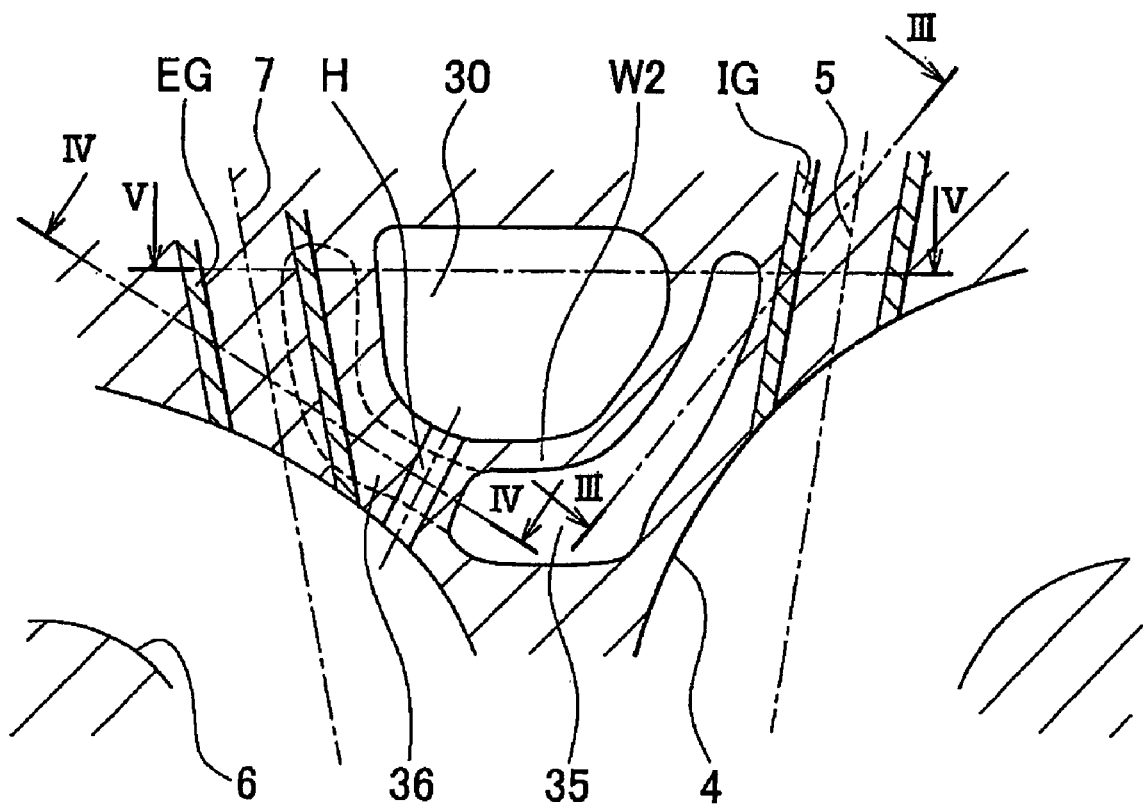
FIG. 2 is a schematic view illustrating details of the region II shown in FIG. 1.
Figure 3:
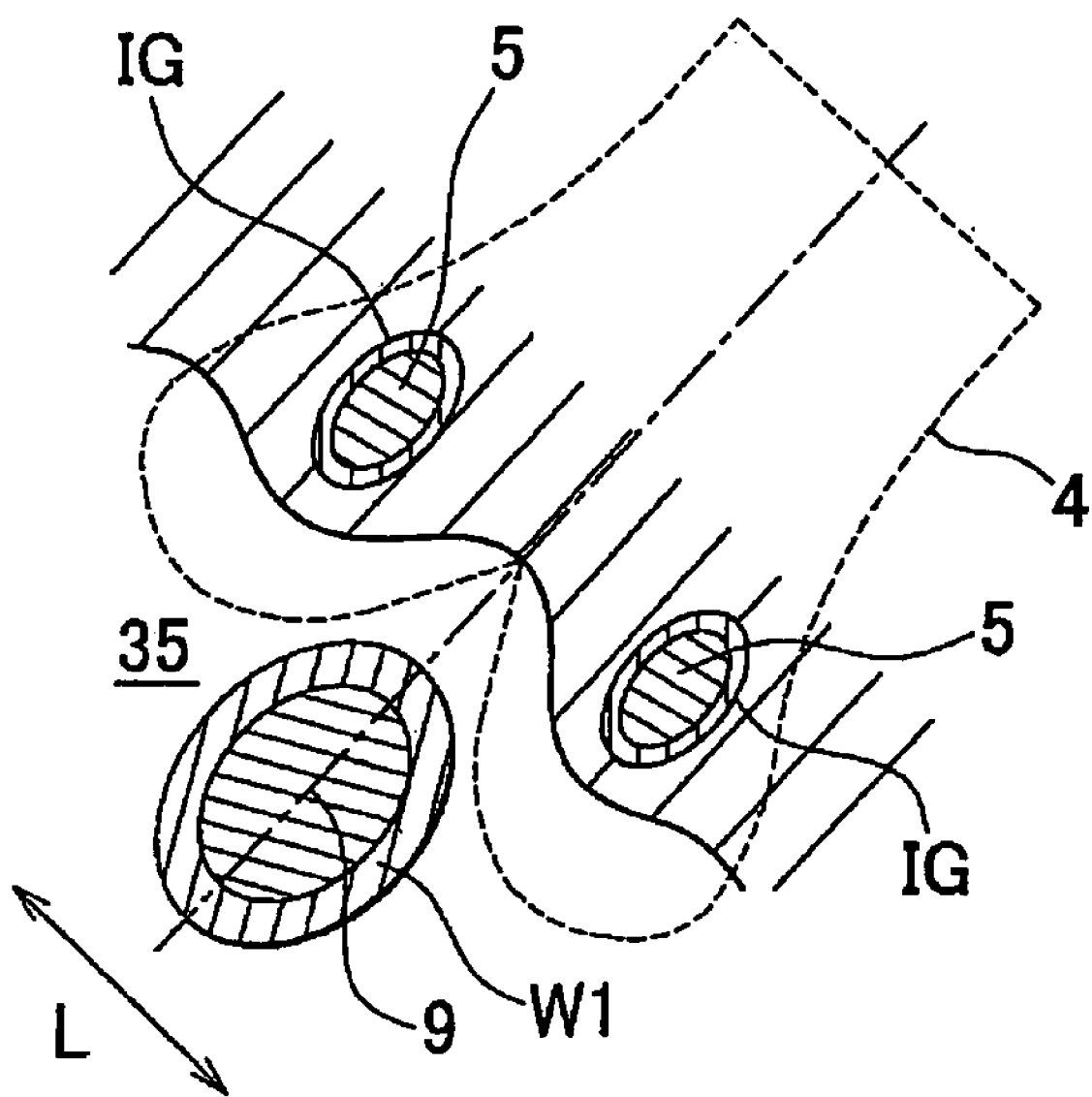
FIG. 3 is a cross section schematically illustrating a cylinder head including a water jacket 35, taken on line III-III of FIG. 2.

The water jacket (hereinafter, sometimes referred to as W/J) 35 is provided between the secondary air passage 30 and the intake passage 4. The W/J 35 is formed in the cylinder head 2. FIG. 2 is a schematic view illustrating details of the region II shown in FIG. 1. Further, FIG. 3 is a cross section schematically illustrating the cylinder head 2 including a water jacket 35, taken on line III-III of FIG. 2. As shown in FIG. 3, the W/J 35 extends in the direction of the cylinder arrangement L. A dividing wall W1 is formed between the W/J 35 and a spark plug 9 that is provided so that an electrode projects from about the center of the upper wall surface of the combustion chamber 3. However, the cross-sectional shape of the W/J 35 is not limited to that shown in FIG. 3, but can be any other appropriate shape. Further, as shown in FIG. 2, the W/J 35 is formed so as to circumscribe the secondary air passage 30. Furthermore, a water pump, which is not shown in the drawings, pumps coolant to the W/J 35. Note that the water pump or circulating paths of coolant, etc., are not limited particularly, but can be any appropriate ones. Accordingly, the exhaust gas that flows in and stays in the secondary air passage 30 is cooled down by the coolant flowing through the W/J 35. Further, because of the location of the W/J 35, the intake passage 4 is well prevented from receiving the heat radiated or discharged from the secondary air passage 30. As a result, in particular, the increase in temperature of the intake gas is minimized.

Figure 4:
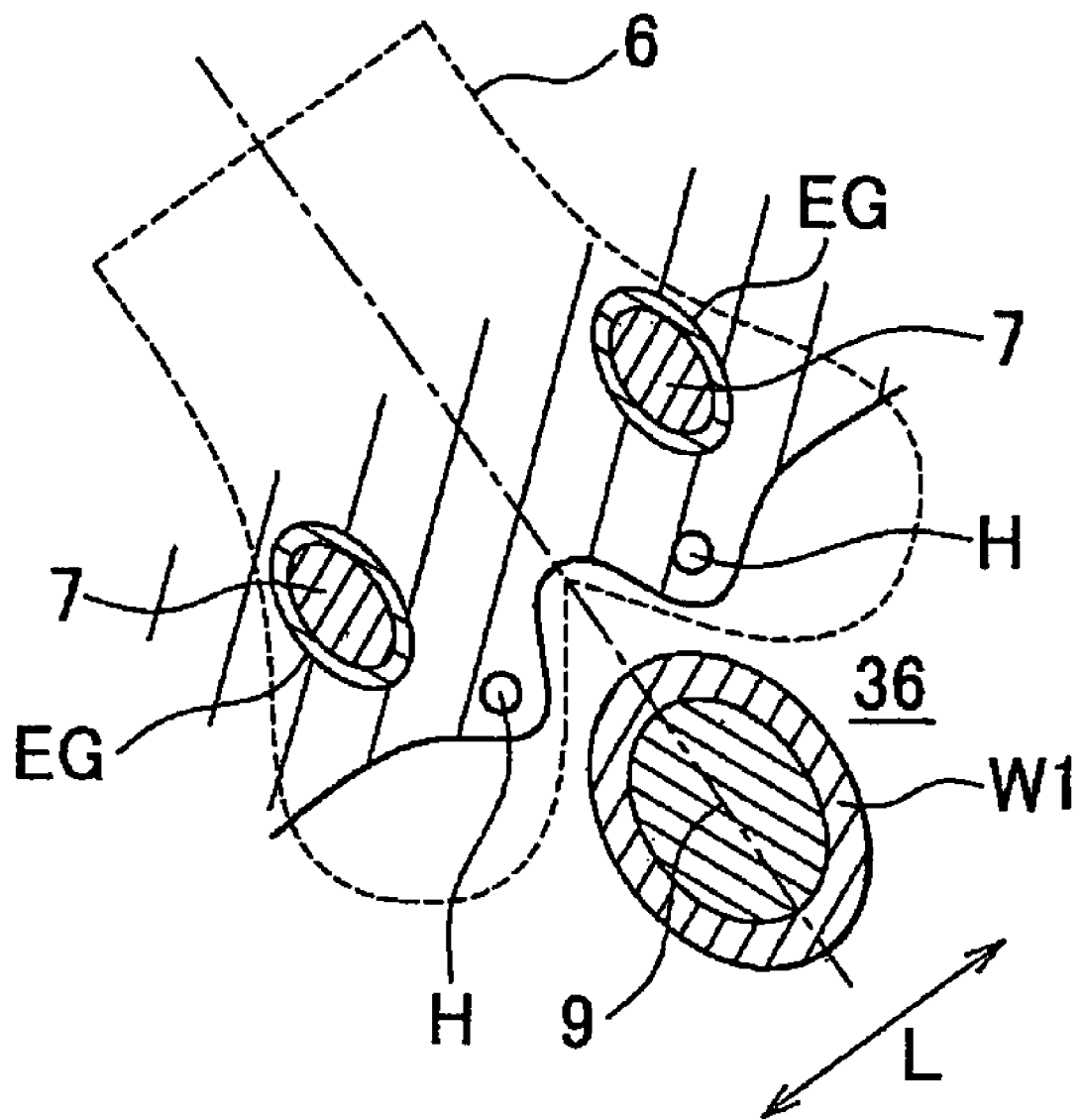
FIG. 4 is a cross section schematically illustrating the cylinder head including a water jacket 36, taken on line IV-IV of FIG. 2.

Meanwhile, the W/J 35 alone sometimes cannot suppress the heat radiation from the secondary air passage 30 to the engine oil staying above the cylinder heads 2 and the valve operating mechanisms 10 and 20, sufficiently. In particular, in the internal combustion engine 1 according to the example embodiment, the secondary air passage 30 and the space Sp are divided by a relatively thin dividing wall. Therefore, if the heat radiation from the secondary air passage 30 is not reduced sufficiently, the engine oil may be quickly deteriorated by heat, and the reliability of the valve operating mechanisms 10 and 20 may decrease. Accordingly, in this example embodiment, a W/J 36 is also provided between the secondary air passage 30 and the exhaust passage 6. FIG. 4 is a cross section schematically illustrating the cylinder head 2 including the W/J 36, taken on line IV-IV of FIG. 2. Similar to the W/J 35, the W/J 36 extends in the direction along the cylinder arrangement L. Similar to W/J 35, the dividing wall W1 is formed between the W/J 36 and the spark plug 9. The W/J 36 communicates with the W/J 35 below the secondary air passage 30. Thus, the W/J 35 and the W/J 36 forms a single W/J. Note that, however, the cross-sectional shape of the W/J 36 is not limited to that shown in FIG. 4, but can be any other appropriate shape. As shown in FIG. 2, similar to the W/J 35, the W/J 36 is also formed so as to circumscribe the secondary air passage 30. Thus, the exhaust gas flowing in and staying in the secondary air passage 30 is cooled down by the coolant flowing through the W/J 36, in addition to W/J 35. Accordingly the heat radiation from the secondary air passage 30 is reduced sufficiently. As a result, adverse influences by the heat radiation from the secondary air passage 30 on the engine oil staying above the cylinder head 2 or the valve operation mechanisms 10 and 20 are reduced.

Figure 5:
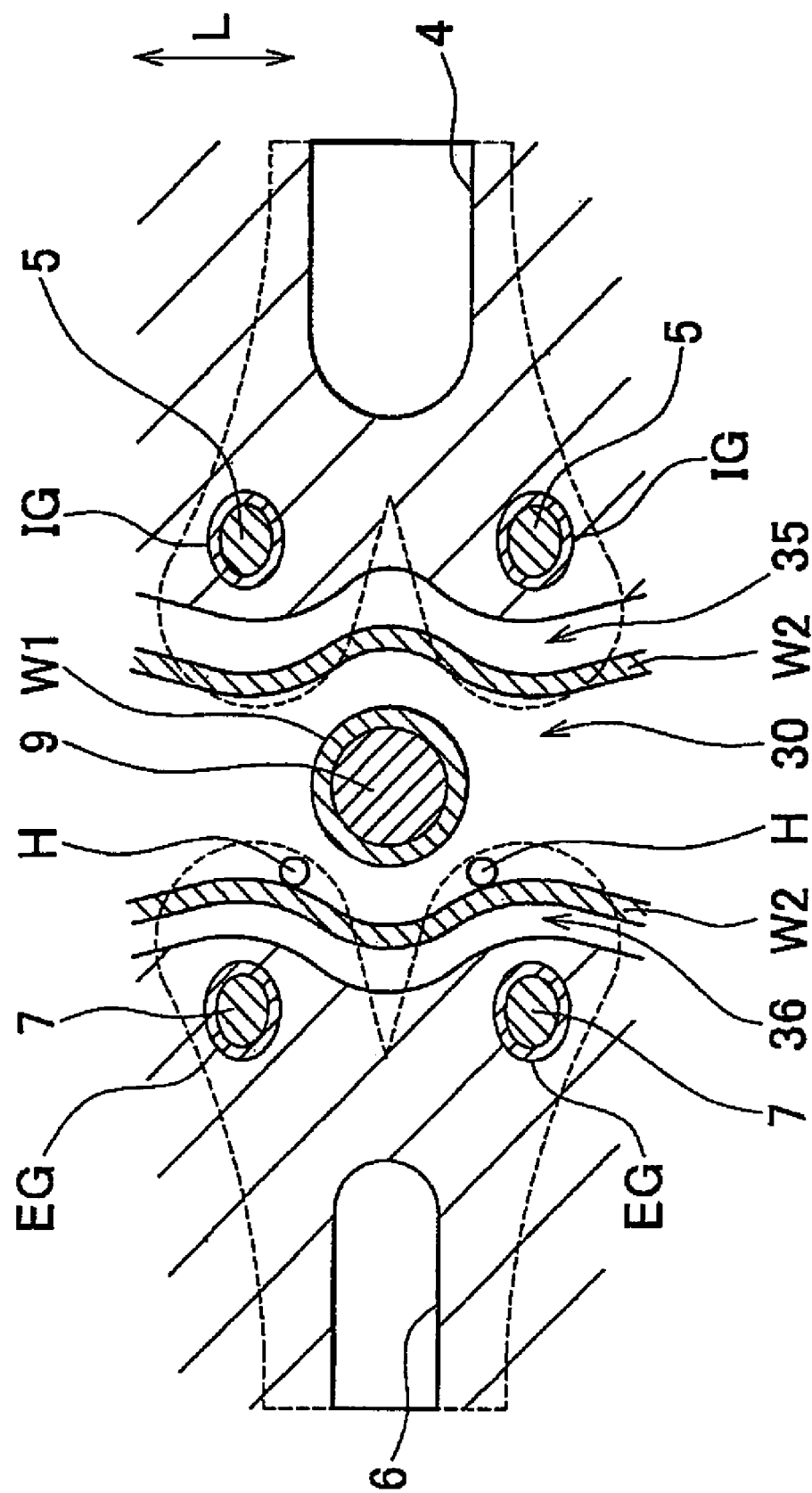
FIG. 5 is a cross section schematically illustrating the cylinder head including a secondary air passage, the water jackets 35 and 36, taken on line V-V of FIG. 2.

FIG. 5 is a cross section schematically illustrating the cylinder head 2 including the secondary air passage 30, the W/J 35 and the W/J 36, taken on line V-V of FIG. 2. The secondary air passage 30 is located between the intake valves 5 and the exhaust valves 7, and extends in the direction along the cylinder arrangement L. Further, the dividing wall W1 is provided between the secondary air passage 30 and the spark plug 9. The secondary air ports H respectively communicate with the branched exhaust passages 6. The W/Js 35 and 36 each extend along the secondary air passage 30. The dividing walls W2 are respectively provided between the secondary air passage 30 and the W/J 35 and between the secondary air passage 30 and the W/J 36. Further, the secondary air passage 30, the W/J 35 and W/J 36 are formed so as to keep prescribed distances from the spark plug 9, the intake valve 5, and the exhaust valve 7. Accordingly, the cross-sectional areas of the W/Js 35, 36 and the secondary air passage 30 can be appropriately secured. Note that the cross-sectional shapes of the secondary air passage 30, W/J 35 and W/J 36 are not limited to those shown in FIG. 5, but can be any other appropriate shape.

The W/J 35 and the W/J 36 do not necessarily communicate with each other below the secondary air passage 30. Further, the W/J 36 may be partially formed as necessary to suppress the heat radiation from the secondary air passage 30. Accordingly, the heat radiation from the secondary air passage 30 is suppressed necessarily and sufficiently. The decrease in pre-heating effect of the secondary air is limited to the bare minimum. Further, if the W/J 35 alone can provide enough effect to suppress the heat radiation from the second air passage 30, the W/J 36 may not be provided. Furthermore, to suppress the heat radiation from the secondary air passage 30, for example, only the W/J 36 may be provided, without providing the W/J 35.

Further, when the W/Js 35, 36 are formed, the wall surfaces of the W/Js 35, 36 on the side of the secondary air passage 30 may be formed in a shape along the wall shape of the secondary air passage 30, thereby forming the W/Js 35, 36 to circumscribe the secondary air passage 30. The wall surface of the W/J 35 on the side of the intake passage 4 and the wall surface of the W/J 36 on the side of the exhaust passage 6 may not have the shape along the wall surface shape of the secondary air passage 30. Further, each of the W/Js 35, 36 may partially have a portion in the longitudinal or extending direction thereof that does not circumscribe the secondary air passage 30. Furthermore, for example, a third W/J may be formed between the secondary air passage 30 and the space Sp so as to circumscribe the secondary air passage 30, if a necessary space can be provided. Further, the third W/J may communicate with the W/J 35 and the W/J 36. Only the third W/J may be provided instead of the W/Js 35, 36 to reduce the heat radiation from the secondary air passage 30.

While the example embodiment shows the internal combustion engine 1 having the secondary air passage 30 that extends in the direction of cylinder arrangement L and located above the combustion chamber 3, the internal combustion engine is not limited thereto, but the present invention may be applied to any internal combustion engine that has a secondary air passage located above a combustion chamber. More specifically, for example, the present invention may be applied to the internal combustion engine in which multiple secondary air passages are provided to respective cylinders so as to extend from the space Sp to the combustion chamber 3. Further, the internal combustion engine 1 may be used for vehicles, such as cars, or for industrial machinery. As described above, the internal combustion engine 1 can be realized that reduces various adverse influences on components of the engine by the heat radiation from the secondary air passage 30 located above the combustion chamber 3.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. An internal combustion engine comprising:
   a combustion chamber;
   a secondary air passage located above the combustion chamber;
   an exhaust passage that communicates with the combustion chamber;
   a first water jacket that is located between the exhaust passage and the secondary air passage; and
   an intake passage that communicates with the combustion chamber to conduct intake air into the combustion chamber,
   wherein the secondary air passage is located between the intake passage and the exhaust passage.

2. The internal combustion engine according to claim 1, wherein the secondary air passage extends in a direction of cylinder arrangement of the internal combustion engine, and the first water jacket is formed along the secondary air passage.

3. The internal combustion engine according to claim 1, further comprising a second water jacket located between the secondary air passage and the intake passage.

4. The internal combustion engine according to claim 1, wherein the first water jacket circumscribes the secondary air passage.

5. The internal combustion engine according to claim 3, wherein the first water jacket and the second water jacket circumscribe the secondary air passage.

6. The internal combustion engine according to claim 4, wherein a shape of a wall surface of the first water jacket on a side of the secondary air passage is formed along a wall surface of the secondary air passage facing the first water jacket.

7. The internal combustion engine according to claim 1, further comprising:
   a space that stores engine oil and is located above the secondary air passage; and
   a third water jacket located between the secondary air passage and the space.

8. The internal combustion engine according to claim 1, further comprising walls defining the secondary air passage and the water jacket, the walls bending inward in the location of the exhaust passage.

9. An internal combustion engine comprising:
   a combustion chamber;
   a secondary air passage located above the combustion chamber;
   an intake passage that communicates with the combustion chamber; and
   a water jacket that is located between the intake passage and the secondary air passage.

10. The internal combustion engine according to claim 9, further comprising:
    an exhaust passage that communicates with the combustion chamber to discharge gas from the combustion chamber,
    wherein the secondary air passage is located between the intake passage and the exhaust passage.

11. The internal combustion engine according to claim 9, wherein the water jacket circumscribes the secondary air passage.

12. The internal combustion engine according to claim 9, further comprising walls defining the secondary air passage and the water jacket, the walls bending inward in the location of the intake passage.

13. An internal combustion engine comprising:
a combustion chamber;
a secondary air passage located above the combustion chamber;
a water jacket that is formed so as to circumscribe the secondary air passage; and
walls defining the secondary air passage and the water jacket formed such that the secondary air passage and the water jacket have prescribed distances from a spark plug, an intake valve and an exhaust valve.

14. The internal combustion engine according to claim 13, further comprising:
an intake passage that communicates with the combustion chamber to conduct intake air into the combustion chamber;
an exhaust passage that communicates with the combustion chamber to discharge gas from the combustion chamber,
wherein the secondary air passage is located between the intake passage and the exhaust passage.

15. The internal combustion engine according to claim 13, wherein the secondary air passage and the water jacket are located between the intake valve and the exhaust valve.

16. The internal combustion engine according to claim 13, wherein the spark plug is located within the secondary air passage.

17. An internal combustion engine comprising:
a combustion chamber;
an intake passage that communicates with the combustion chamber to conduct intake air into the combustion chamber;
an exhaust passage that communicates with the combustion chamber to discharge gas from the combustion chamber;
a secondary air passage that is located above the combustion chamber and between the intake passage and the exhaust passage;
a space that stores engine oil and is located above the secondary air passage; and
a water jacket located between the secondary air passage and the space.

18. The internal combustion engine according to claim 17, further comprising walls defining the secondary air passage and the water jacket, the walls bending inward in the location of the exhaust passage.

* * * * *